United States Patent [19]

Horgan, Jr.

[11] Patent Number: 4,793,115

[45] Date of Patent: Dec. 27, 1988

[54] METHOD OF CLADDING METAL EXTRUSIONS AND PRODUCT OBTAINED THEREFROM

[75] Inventor: William J. Horgan, Jr., Pittsburgh, Pa.

[73] Assignee: Blumcraft of Pittsburgh, Philadelphia, Pa.

[21] Appl. No.: 119,546

[22] Filed: Nov. 12, 1987

[51] Int. Cl.⁴ .......................... E04C 3/30; B23P 17/00; B23P 11/02

[52] U.S. Cl. .......................................... 52/728; 52/730; 52/222; 29/446; 29/469.5; 29/155 R; 29/509

[58] Field of Search ................. 29/509, 515, 446, 448, 29/155 R; 52/222, 729, 730, 97, 456, 458, 728, 729, 420

[56] References Cited

U.S. PATENT DOCUMENTS

| | | | |
|---|---|---|---|
| 1,363,413 | 12/1920 | Hester | 52/728 |
| 1,584,131 | 5/1926 | Perritt | 52/97 X |
| 1,989,834 | 2/1935 | Watson | 29/155 R |
| 2,304,718 | 12/1942 | Swart | 52/420 X |
| 3,121,649 | 2/1964 | Oliver | 52/420 X |
| 3,412,516 | 11/1968 | Lindstrom | 52/222 X |
| 3,650,144 | 3/1972 | James | 29/469.5 X |
| 3,740,908 | 6/1973 | Moore | 52/420 X |
| 4,081,941 | 4/1978 | Van Ausdall | 52/729 X |
| 4,554,718 | 11/1985 | Ollinger | 52/729 X |

*Primary Examiner*—Charlie T. Moon
*Attorney, Agent, or Firm*—Paul & Paul

[57] ABSTRACT

A method of cladding a metal extrusion, such as aluminum or the like, with a piece of cladding material, such as brass, bronze, stainless steel, etc., is provided which comprises the steps of: (1) applying a strip of adhesive material, preferably double-faced tape, to a top surface of the extrusion; (2) placing the cladding material against the extrusion so that a cover portion of the cladding material is in overlying, spaced relation to the adhesive material; (3) applying pressure to the cladding material to force it into contact with the adhesive material; and (4) bending a bottom portion of the cladding material around a lower edge of the extrusion to create a constant spring-tension between the cladding material and the adhesive material. Also disclosed is the cladded metal extrusion obtained by the above method.

18 Claims, 1 Drawing Sheet

METHOD OF CLADDING METAL EXTRUSIONS AND PRODUCT OBTAINED THEREFROM

BACKGROUND OF THE INVENTION

This invention relates to a method of cladding a metal extrusion, such as aluminum, with a cladding material made of stainless steel, brass, bronze, or the like. More particularly, the present invention relates to a method of cladding a metal extrusion which utilizes spring-tension upon an adhesive material to secure the cladding material to the extrusion.

The term "cladding" as used in the art, refers to both the material which is affixed to the extrusion and to the process of affixing the material to the extrusion. For purposes of clarity, the material will be referred to herein as the "cladding material" and the term "cladding" will be used to reference the method or process of affixing the cladding material to the extrusion.

Cladding metal extrusions, as such, is a relatively well known means of enhancing the aesthetic appearance of metal extrusions. Cladding is generally considered desirable in that it permits the use of cheaper, lighter and more "workable" metals, such as aluminum, to be used for the extrusion, without being forced to accept the less aesthetic appearance of such metals. For example, cladding permits an extrusion of aluminum to have the appearance of bronze, stainless steel, brass, etc. which are often more attractive and more desirable "finishes" than an aluminum "finish." Thus, an extrusion can have the appearance of bronze, for example, without incurring the substantial cost, weight and tolerance limitations of a solid bronze extrusion.

Cladding is also advantageous when large extrusions are necessary or desired. Often, large extrusions are necessary which exceed the dimensional limitations of the extrusion process. In such situations, two small extrusions are joined together to form a single large extrusion, such as by bolting the two extrusions together with a plate. By cladding the resulting extrusion, the unsightly appearance of the plate, etc. is concealed and a single, uniform "finish" is obtained for the large extrusion.

Typically, the cladding process is used for extrusions which are to be used for glass door and window structures or other architectural design structures where an attractive appearance is most desirable.

THE PRIOR ART

Many methods of cladding metal extrusions are generally known in the art. One such method is to simply fasten the cladding material to the extrusion by screws, rivets or other like fasteners. This method, however, has several disadvantages and is generally not considered an acceptable method. For example, the appearance of the screws or rivets detracts from the overall aesthetic appearance of the extrusion and, in that regard, is considered a self-defeating cladding method. A further disadvantage is that screws and rivets can become loose with time and the cladding material could begin to shift, rattle or fall off.

Another cladding method which has been used in the past involved a friction-type fitting of the cladding material to the extrusion. In such a method, the cladding material was formed to have an inverted U-shaped top portion which was designed to fit closely over the extrusion. The inner-most leg of the U-shaped top portion was to fit within a channel in the extrusion which received the glass panel of the window or door. Once the top portion was properly aligned, the bottom portion of the cladding material was bent around the bottom of the extrusion to secure the cladding material in place.

This method of cladding also had several disadvantages. One such disadvantage was that the cladding material had to be manufactured with several precise bends and folds, all within close dimensional tolerances, in order to fit the extrusion properly. This procedure added considerable to the time and expense of the overall cladding procedure. Another primary disadvantage was that the cladding material occupied space in the channel in which the glass panel was to be placed which meant that thinner glass panels had to be used or larger channels manufactured to accommodate the glass panel and the cladding material. The presence of the cladding material in the channel also interfered with several of the mechanical glazing systems used to secure the glass panel to the extrusion.

The most frequently used cladding method today is a simple adhesive system wherein a suitable adhesive material, such as silicone or mastic, is applied to the mating surfaces of the extrusion and the cladding material. The cladding material is then pressed against the extrusion and clamped in place until the adhesive had dried or set to produce a secure adhesive bond between the extrusion and the cladding material. This adhesive bonding method is not without its disadvantages, however. First, silicone and mastic adhesives are fairly expensive, especially considering that a substantial amount of adhesive is required to provide adequate bonding. Second, the adhesive must be applied manually and, therefore, is not as efficient as a machine or automated process. Third, adhesives do occasionally fail and the cladding material will simply fall off the extrusion. Fourth, upon application of pressure to the cladding material and the extrusion, excess adhesive material will be expelled and must be wiped off manually. Finally, the time required for the adhesive to dry or set causes unnecessary delays in the process and increases the overall cost of the process.

SUMMARY OF THE INVENTION

I have invented a method of cladding metal extrusions which avoid the disadvantages of the prior art methods mentioned above and which is faster, cheaper, easier and more efficient than the cladding methods heretofore known in the art.

Briefly, the invention comprises a method of cladding a metal extrusion by the use of an adhesive material and the spring-tension of the cladding material. The first step in the method is to apply an adhesive material to the upper surface of the extrusion, the preferred adhesive material being double-faced tape. The next step is to place the cladding material in position against the extrusion. The cladding material is of such size and shape so as to have a cover portion which is in overlying, spaced relation to the upper surface of the extrusion and to the adhesive material at this state of the process. Pressure is then applied to the cover portion of the cladding material to force the cladding material into contact with the adhesive. The lower-most portion of the cladding material is then bent tightly around the lower edge of the extrusion to maintain the contact with the adhesive material under the constant spring-tension of the cladding material.

As will be readily understood upon a further reading of this specification, the present invention may be utilized on a wide variety of extrusions of differing shapes and sizes, and can be used with a wide variety of glazing systems known in the art. For example, the cladding method described herein is particularly well suited for use on a door shoe assembly as described in my prior copending U.S. Patent Application Ser. No. 862,994, filed May 14, 1986, entitled DOOR SHOE ASSEMBLY, the disclosure of which is hereby incorporated by reference.

It will also become apparent that the present invention offers a cladding method with a minimum of manual labor involved, which can be totally automated, and which can be accomplished more cheaply, more quickly and more efficiently than prior art cladding methods.

Accordingly, it is a primary object of the invention to provide a novel method of cladding metal extrusions.

It is a further object of the invention to provide a cladding method which utilizes constant spring-tension upon an adhesive material.

It is another object of the invention to provide a cladding method which does not require the use of a wet adhesive and does not require drying or set-up time for the adhesive before bonding is obtained.

It is a further object of the invention to accomplish the above object by providing a method of cladding metal extrusions comprising:

(1) applying a strip of adhesive material to an upper surface of a metal extrusion;

(2) placing a strip of cladding material against the extrusion wherein a portion of the cladding material is in overlying, spaced relation to the adhesive material;

(3) applying pressure to the cladding material to force the cladding material into contact with the adhesive material; and (4) bending a lower end of the cladding material around a bottom edge of the extrusion to create constant spring-tension between the cladding material and the adhesive material.

It is still another object of the invention to provide an extrusion which has been cladded by the above cladding method.

These and other objects of the invention will become apparent upon a further reading of the specification, including the detailed description of the embodiments with reference to the drawings, and the appended claims.

DETAILED DESCRIPTION OF THE EMBODIMENTS

Figure 1:
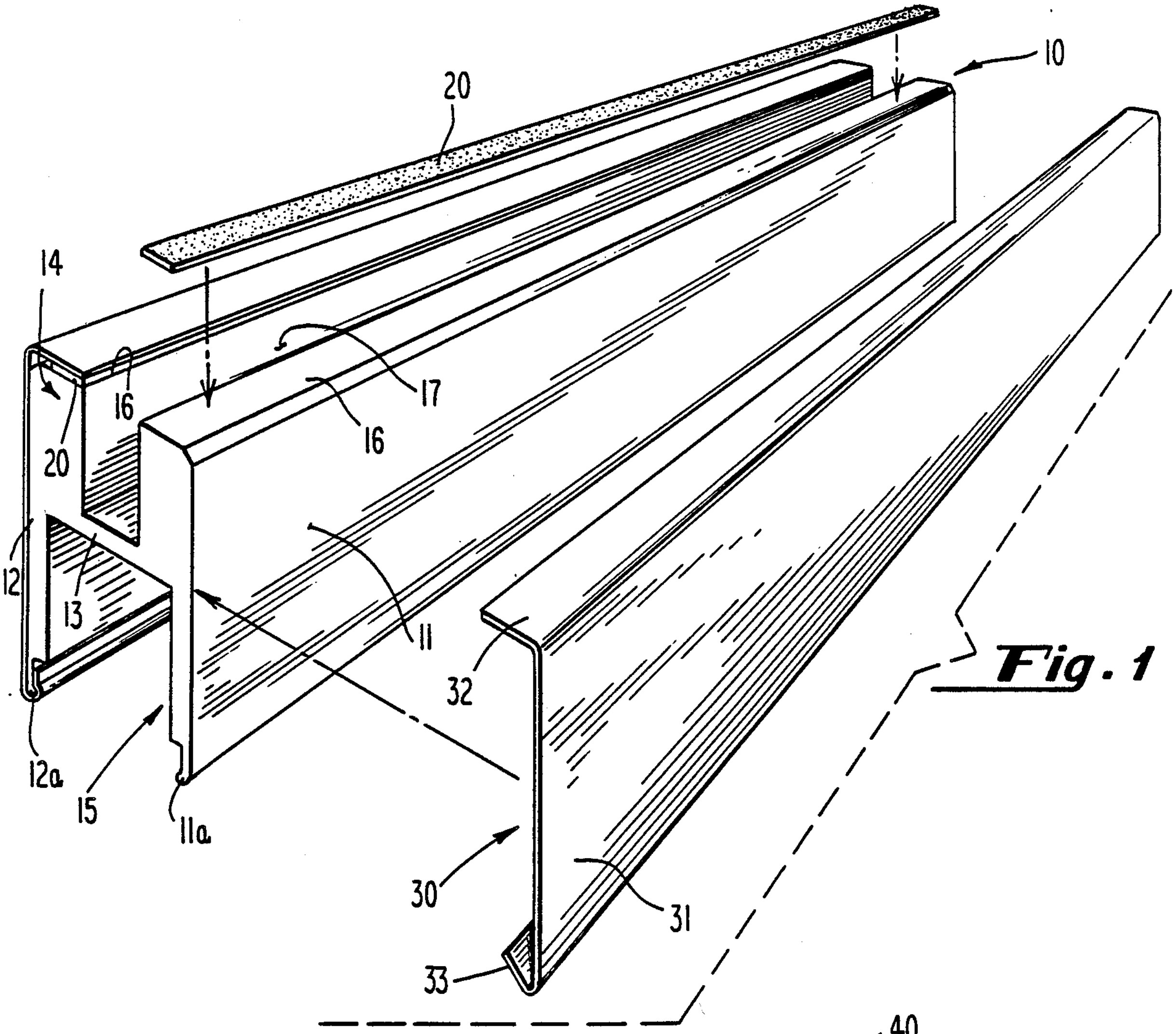
FIG. 1 is an exploded perspective view illustrating the attachment of the adhesive strip and the cladding material to the metal extrusion.
Figure 3:
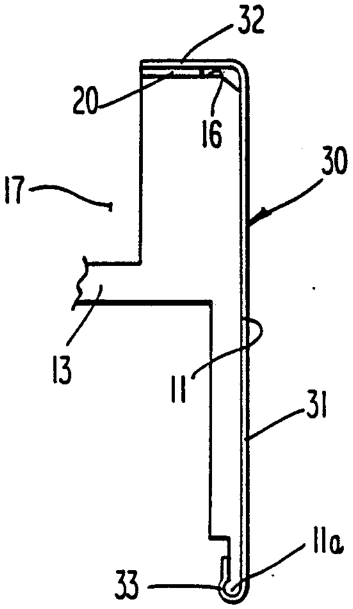
FIG. 3 is a partly fragmented end view as in FIG. 2, with the cladding material being bent around the extrusion and the cladding method being completed.

With reference first being made to FIG. 1, illustrated therein is a metal extrusion 10 which, in the particular embodiment illustrated in the Figures, is of a substantially H-shaped construction, having side walls 11, 12 and a horizontal web 13 dividing the top portion 14 from the bottom portion 15. The top portion 14 of extrusion 10 is provided with a horizontal top surface 16 which is separated by a channel 17 longitudinally disposed within the extrusion 10. The channel 17 is provided in the extrusion 10 to receive a glass panel or the like therein, whereby the extrusion can be used as part of a door or window structure.

The first step in the method of cladding the metal extrusion 10 in accordance with the present invention is the application of a strip of adhesive materials 20 to the top surface 16 of extrusion 10. In the preferred embodiment as illustrated in the Figures, the adhesive material 20 is a strip of double-faced tape. Although other types of adhesive materials can be used in the present invention, double-faced tape is preferred because it can be readily applied by a machine process, is less expensive than other adhesives, it does not ooze like flowable adhesives and it does not require time to dry or set before its full bonding properties are realized.

Once the adhesive material 20 has been applied, the desired cladding material 30, which can be of brass, bronze, stainless steel, or the like, is placed against the metal extrusion 10. As seen in the Figures, the cladding material 30 is shaped so as to substantially cover the exposed portions of the extrusion and has a vertical portion 31 and a horizontal portion 32. The bottom end 33 of the cladding material 30 is preferably bent into an open V-shape which facilitates in properly aligning the cladding material and also facilitates the bending of the cladding material around the extrusion.

Figure 2:
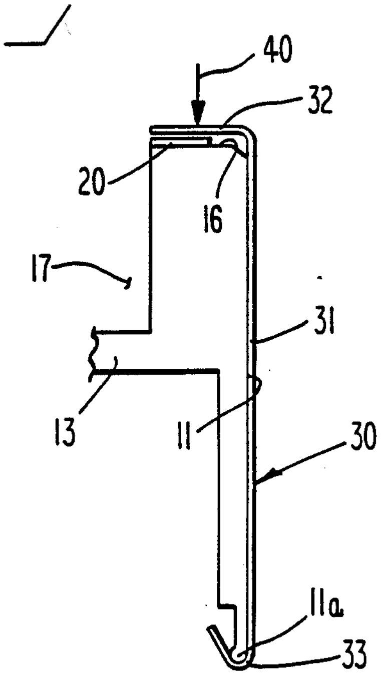
FIG. 2 is a partly fragmented end view of the metal extrusion, adhesive strip and cladding material prior to the application of pressure to the cladding material and the bending of the cladding material around the lower edge of the extrusion.

With reference to FIG. 2, it can be seen that when cladding material 30 is initially placed against the extrusion 10, particularly side wall 11 thereof, the horizontal portion 32 of cladding material 30 is disposed in overlying relation to the top surface 16 of extrusion 10 and the adhesive material 20 applied thereto, and is also spaced from the adhesive material 20 so as not to touch the adhesive material. This alignment of the cladding material is facilitated by placing the V-shaped bend 33 in the cladding material 30 at a location whereby the lower edge of the side wall 11 of extrusion 10 can be tightly placed within the V-shaped bend and then the cladding material can be pivoted toward the extrusion and into the position illustrated in FIG. 2.

From the position illustrated in FIG. 2, pressure is applied to the top portion 32 of cladding material 30 to force the cladding material into contact with the adhesive material 20 to secure the cladding material 30 temporarily in place. The application of pressure is represented in FIG. 2 by force arrow 40.

With the pressure applied to top portion 32 of cladding material 30, the bottom edge 33 of cladding material 30 is bent around the lower edge of side wall 11 of extrusion 10, thereby causing the spring-tension in the cladding material 30 which creates a constant pressure on the contact between cover portion 32 of cladding material 30 and the adhesive material 20.

As seen in the Figures, the lower edge of side walls 11, 12 of extrusion 10 are preferably formed to have a rounded member 11*a*, 23*a* at the terminal ends thereof. The rounded members 11*a*, 12*a* facilitate the final bending, of the cladding material around the extrusion and permit the use of a thicker cladding material than might otherwise be possible. Although a rounded surface is not necessary, it is desirable because the maluability characteristics of the cladding material are such that it would be difficult to bend the cladding material around a squared edge of the extrusion without reducing the thickness of the cladding material.

If desired, the above-described method may be used on the opposite side of the metal extrusion, such as side wall 12 of extrusion 10 as seen in FIG. 1, whereby both exposed sides of the extrusion are covered by the cladding material.

It should also be noted that the within method of cladding a metal extrusion can be used on a variety of different size and shape extrusions. In practice, it has been particularly desirable to use the method on extrusions of 10 feet in length, using a 10-foot long piece of cladding material, and simply cutting the cladded extrusion to the desired length.

The foregoing description contains references to particular structures and materials which are used for purposes of illustration only and are not to be construed as limitations upon the invention. For example, although it has been mentioned that the extrusion is preferably aluminum, it is to be understood that cladding method may also be practiced with extrusions made of other metals. Likewise, particular cladding materials have been mentioned but it is to be understood that the present invention is not limited to cladding materials made of those particular metals. Furthermore, upon reading the foregoing specification, various modifications and alterations may suggest themselves to those skilled in the art, all of which are intended to be within the spirit and scope of the present invention as defined in the appended claims.

What is claimed is:

1. A method of cladding a metal extrusion, which method comprises:

(a) applying a strip of adhesive material to a top surface of a metal extrusion;

(b) placing a piece of cladding material against the metal extrusion and adjacent a side wall thereof, wherein a cover portion of said cladding material is disposed in overlying spaced relation to said strip of adhesive material;

(c) applying pressure to said cover portion of said cladding material to force said cover portion into contact with said adhesive material; and (d) bending a bottom portion of said cladding material around a lower edge of said metal extrusion to create constant spring-tension on said strip of adhesive material.

2. The method of claim 1, further comprising the step of repeating steps (a)-(d) to an opposite side wall of said metal extrusion.

3. The method of claim 1, wherein said metal extrusion is made of aluminum.

4. The method of claim 1, wherein said strip of adhesive material comprises a strip of double-faced tape.

5. The method of claim 1, wherein said cladding material is made of brass.

6. The method of claim 1, wherein said cladding material is made of bronze.

7. The method of claim 1, wherein said cladding material is made of stainless steel.

8. The method of claim 1, wherein said piece of cladding material comprises a vertical portion sized so as to substantially correspond to the height of said side wall of said extrusion; a cover portion adjacent to said vertical portion and disposed substantially perpendicular thereto, said cover portion being sized so as to substantially correspond to the depth of said top surface of said extrusion; and a bottom portion bend upward and inward to form a substantially open V-shape.

9. The method of claim 1, wherein the lower edge of said metal extrusion is substantially founded in shape.

10. A cladded metal extrusion comprising:

(a) a metal extrusion having a strip of adhesive material disposed thereon on a top surface thereof;

(b) a piece of cladding material disposed against said metal extrusion and adjacent a side wall thereof, said cladding material having a cover portion disposed against said strip of adhesive material and a bottom portion in wrapped engagement with a lower edge of said side wall of said metal extrusion; and (c) wherein said cladding material comprises means for creating a constant spring-tension on said strip of adhesive material to fixedly secure said piece of cladding material to said metal extrusion.

11. The cladded metal extrusion of claim 10, wherein a piece of cladding material is affixed to an opposite side wall of said extrusion.

12. The cladded metal extrusion of claim 10, wherein-said metal extrusion is made of aluminum.

13. The cladded metal extrusion of claim 10, wherein said strip of adhesive material comprises a strip of doublefaced tape.

14. The cladded metal extrusion of claim 10, wherein said cladding material is made of brass.

15. The cladded metal extrusion of claim 10, wherein said cladding material is made of bronze.

16. The cladded metal extrusion of claim 10, wherein said cladding material is made of stainless steel.

17. The cladded metal extrusion of claim 10, wherein said piece of cladding material comprises a vertical portion sized so as to substantially correspond with the height of said side wall of said extrusion; a cover portion adjacent to said vertical portion and disposed substantially perpendicular thereto, said cover portion being sized so as to substantially correspond to the depth of said top surface of said extrusion; and a bottom portion bent upward and inward to form a substantially open V-shape.

18. The cladded metal extrusion of claim 10, wherein the lower edge of said side wall of said metal extrusion is substantially rounded in shape.

* * * * *

UNITED STATES PATENT OFFICE

CERTIFICATE OF CORRECTION

Patent No. 4,793,115 Dated December 27, 1988

Inventor(s) William J. Horgan, Jr.

It is certified that error appears in the above-identified patent and that said Letters Patent is hereby corrected as shown below:

35 U.S.C. 254

Column 4, line 62, "23a" should be "12a".
Column 6, line 15, "founded" should be "rounded".

Signed and Sealed this

Second Day of May, 1989

*Attest:*

DONALD J. QUIGG

*Attesting Officer*

*Commissioner of Patents and Trademarks*